United States Patent
Young, III

(10) Patent No.: US 7,293,531 B2
(45) Date of Patent: Nov. 13, 2007

(54) ELASTIC DOG LEASH AND COUPLER

(75) Inventor: W. Michael Young, III, Collegeville, PA (US)

(73) Assignee: Wacky Walk'r & Petc., Inc., Collegeville, PA (US)

( * ) Notice: Subject to any disclaimer, the term of this patent is extended or adjusted under 35 U.S.C. 154(b) by 0 days.

(21) Appl. No.: 11/302,017

(22) Filed: Dec. 13, 2005

(65) Prior Publication Data
US 2006/0102104 A1  May 18, 2006

Related U.S. Application Data

(62) Division of application No. 10/913,809, filed on Aug. 6, 2004, now Pat. No. 6,990,929.

(60) Provisional application No. 60/563,489, filed on Apr. 19, 2004.

(51) Int. Cl.
*A01K 27/00*     (2006.01)
(52) U.S. Cl. ...................... 119/798; 119/797
(58) Field of Classification Search .............. 119/798, 119/797, 792, 793, 795, 770, 856
See application file for complete search history.

(56) References Cited

U.S. PATENT DOCUMENTS

| | | | |
|---|---|---|---|
| 1,924,596 A * | 8/1933 | Davis ......................... | 119/798 |
| 2,275,701 A | 3/1942 | Charles ....................... | 119/798 |
| 2,737,154 A | 3/1956 | Michonski ................... | 119/798 |
| 2,937,023 A | 5/1960 | Seymour ..................... | 482/92 |
| 2,994,300 A | 8/1961 | Grahling ..................... | 119/770 |
| 3,441,005 A | 4/1969 | Fink ........................... | 119/798 |
| 4,404,927 A | 9/1983 | Woutat ....................... | 119/776 |
| 4,541,364 A * | 9/1985 | Contello ..................... | 119/772 |
| 4,745,883 A * | 5/1988 | Baggetta ..................... | 119/770 |
| 4,948,117 A * | 8/1990 | Burke ......................... | 482/55 |
| 4,993,366 A * | 2/1991 | Sager .......................... | 119/798 |
| 5,040,788 A | 8/1991 | Randall ....................... | 482/129 |
| 5,146,876 A | 9/1992 | McPhail ...................... | 119/109 |
| RE34,351 E | 8/1993 | Lacey ......................... | 119/776 |
| 5,247,906 A | 9/1993 | Stevenson ................... | 119/795 |
| 5,291,856 A * | 3/1994 | Goller ......................... | 119/795 |
| 5,388,315 A * | 2/1995 | Jones ......................... | 24/712.1 |
| 5,485,811 A * | 1/1996 | Jacobsen et al. ............ | 119/798 |
| 5,511,293 A * | 4/1996 | Hubbard et al. .............. | 24/442 |

(Continued)

*Primary Examiner*—Yvonne R. Abbott
(74) *Attorney, Agent, or Firm*—Michael F. Petock, Esq.; Petock & Petock, LLC

(57) ABSTRACT

An elastic dog leash and coupler utilizes brightly colored florescent latex tubing for a major portion of the leash and coupler. The tubing is mounted between rings. A monofilament nylon line is mounted within the tubing and connected to the rings. The monofilament line has a length significantly greater than the unstretched length of the tubing, and limits the degree to which the tubing may be stretched. With respect to the leash, a nonstretchable webbing handle is attached at one end and a stop section of the leash is attached at the other end. The coupler is comprised of a plurality of sections of tubing mounted to a ring, which may be attached to the end of the leash. The other ends of the tubing of the coupler are provided with nonstretchable webbing material which may be utilized as a stop section for the coupler leash. The webbing material may be provided with a reflective stripe for additional safety at night.

6 Claims, 3 Drawing Sheets

U.S. PATENT DOCUMENTS

| | | | | |
|---|---|---|---|---|
| D372,756 S | | 8/1996 | May | D21/803 |
| 5,613,926 A | * | 3/1997 | Michaelson | 482/121 |
| 5,706,764 A | | 1/1998 | Irbinskas | 119/792 |
| 5,718,192 A | * | 2/1998 | Sebastian | 119/795 |
| 5,732,662 A | * | 3/1998 | Jacobsen | 119/798 |
| 5,732,663 A | | 3/1998 | Manzella | 119/798 |
| 5,740,764 A | * | 4/1998 | Jacobsen | 119/798 |
| 5,749,326 A | * | 5/1998 | Jones et al. | 119/798 |
| 5,873,328 A | * | 2/1999 | Campbell | 119/798 |
| 5,915,336 A | | 6/1999 | Watson | 119/797 |
| 6,006,699 A | | 12/1999 | Keever | 119/795 |
| 6,053,129 A | | 4/2000 | Akre | 119/795 |
| 6,095,093 A | | 8/2000 | Kisko et al. | 119/770 |
| 6,125,793 A | | 10/2000 | Petty | 119/856 |
| 6,126,578 A | * | 10/2000 | Lapointe | 482/77 |
| 6,308,662 B1 | * | 10/2001 | Furman | 119/776 |
| 6,321,753 B1 | * | 11/2001 | Anderson | 128/869 |
| 6,460,488 B1 | * | 10/2002 | Manzella et al. | 119/798 |
| 6,467,437 B2 | | 10/2002 | Donovan et al. | 119/798 |
| 6,513,460 B2 | * | 2/2003 | Fountoulakis | 119/770 |
| 6,772,711 B2 | * | 8/2004 | Morgan | 119/795 |
| 6,827,045 B1 | * | 12/2004 | Willner et al. | 119/795 |
| 2005/0113223 A1 | * | 5/2005 | Dovner et al. | 482/121 |
| 2005/0227833 A1 | * | 10/2005 | Wilkinson | 482/124 |
| 2005/0251895 A1 | * | 11/2005 | Farrah et al. | 2/227 |
| 2005/0252717 A1 | * | 11/2005 | Farrah et al. | 182/3 |
| 2006/0081197 A1 | * | 4/2006 | Kuykendall | 119/792 |
| 2007/0099780 A1 | * | 5/2007 | Bowser | 482/148 |

* cited by examiner

ELASTIC DOG LEASH AND COUPLER

CROSS REFERENCE TO RELATED APPLICATIONS

This application is a division of and claims the benefit of U.S. patent application Ser. No. 10/913,809 filed Aug. 6, 2004 now U.S. Pat. No. 6,990,929 by the inventor herein and entitled "ELASTIC DOG LEASH AND COUPLER" which application claims the benefit of U.S. Provisional Appl. No. 60/563,489 filed Apr. 19, 2004 by the inventor herein and entitled "ELASTIC DOG LEASH".

FIELD OF THE INVENTION

The present invention relates to a dog leash and coupler having at least a portion of each made of an elastic material. More particularly, at least a portion of the dog leash and coupler is made of a colored surgical type tubing, which may preferably be florescent.

BACKGROUND OF THE INVENTION

The walking of a dog on a leash is a common practice. This is usually done at least once a day, every day. A leash is a desirable item to keep the dog within a safe distance of its owner, and is often required in many localities. However, a dog may often dart out in various directions causing a substantial shock or jerk on both the dog's neck and the owners arm and shoulder when the dog reaches the end of the length of the leash. Further, there is a need for a comfortable handle and a means to be able to hold the dog firmly when danger is near, such as close traffic. Further, some owners have multiple dogs and a coupler having some or all of the features would be desirable.

SUMMARY OF THE INVENTION

An advantage of the present invention is that it relieves the stress on both the dog or other animal being walked and the person walking the dog or other animal. In other words, as the dog or other animal may lurch, the elasticity of the leash reduces the amount of stress on both the neck of the dog and the arm and shoulder of the person walking the dog when the dog reaches the maximum length of the unstretched leash.

Another advantage of the present invention is that the colored tubing, which is preferably florescent, provides a pleasing effect and is readily visible from a distance.

Another advantage of the present invention is that it provides a comfortable handle.

Another advantage of the present invention is that it provides a stop section wherein a dog or other animal being walked may be grabbed firmly without the possibility of stretching of the leash by grabbing a stop section near the collar.

Another advantage of the present invention is that it provides a means of being readily visible when light is reflected by reflective stripes on the web portion of the leash and/or coupler, such as from automotive lights or the like.

The invention comprises an elastic dog leash made of a colored surgical type tubing, preferably of a florescent color. The elastic leash has a major section of elastic tubing. The remaining portions of the leash, including the handle and a portion of the leash near the end where the leash attaches to the dog collar would be made of a webbing material which is not elastic. The tubing may be comprised of at least 90% pure rubber made from latex. The elastic tubing is a predetermined length in its unstretched condition and may be stretch beyond a second predetermined length. The tubing is attached at its first and second ends to rings. A nonstretchable line, such as monofilament nylon, of a the second predetermined length is mounted within the tubing and attached to the first and second rings to prevent stretching of the tubing beyond a predetermined limit. Nonstretchable webbing is attached to the first ring and is formed as a handle. A second nonstretchable webbing material is attached at its proximal end to the second ring and acts as a stop section. The second nonstretchable webbing is provided with a releasable clasp attached to its distal end thereof for attachment to a coupler for multiple animals or to the collar or other harness of an animal.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
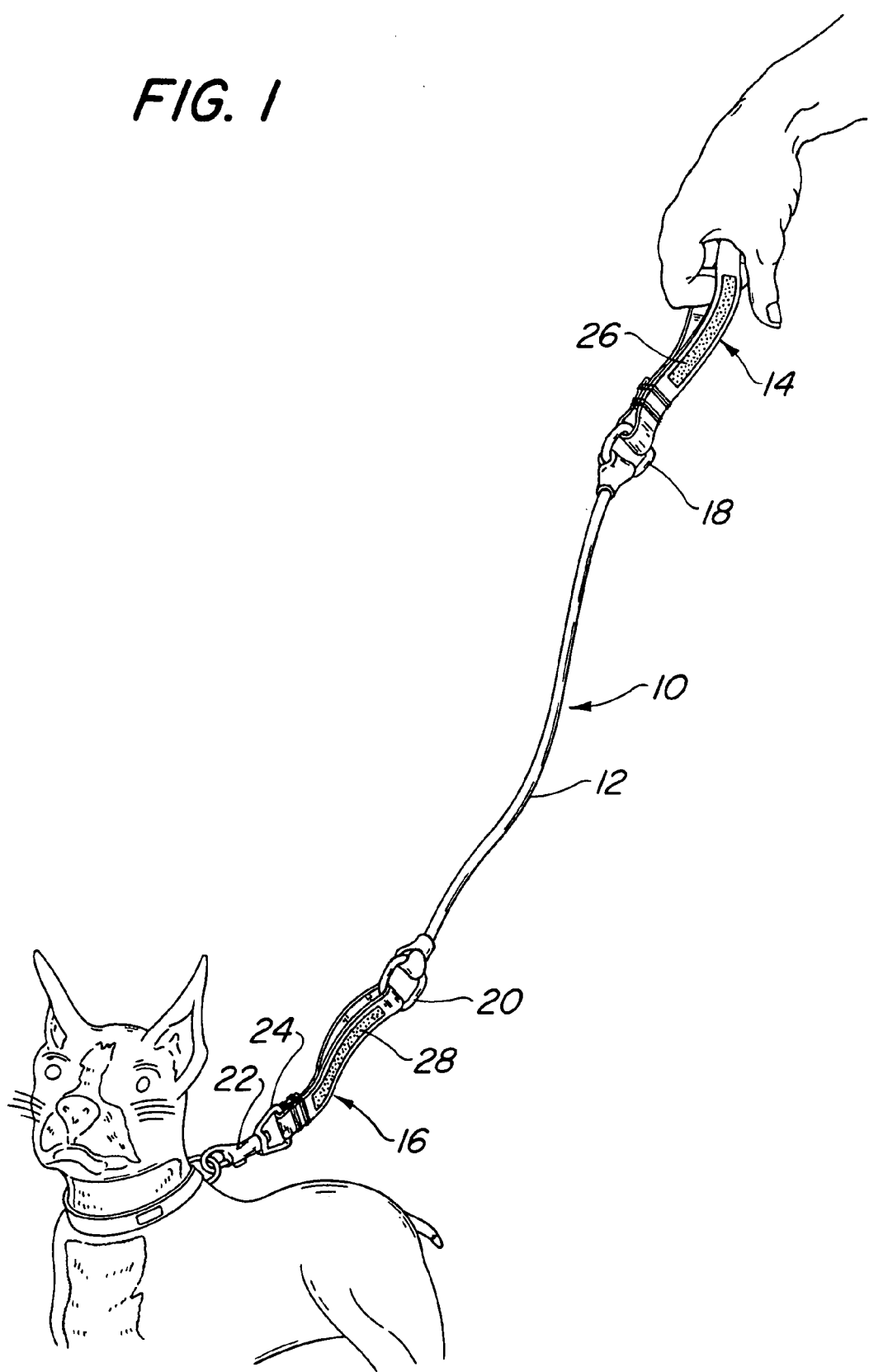
FIG. 1 is a view in perspective of a leash in accordance with the present invention illustrating it being held by the hand of a person and attached to a dog.
Figure 2:
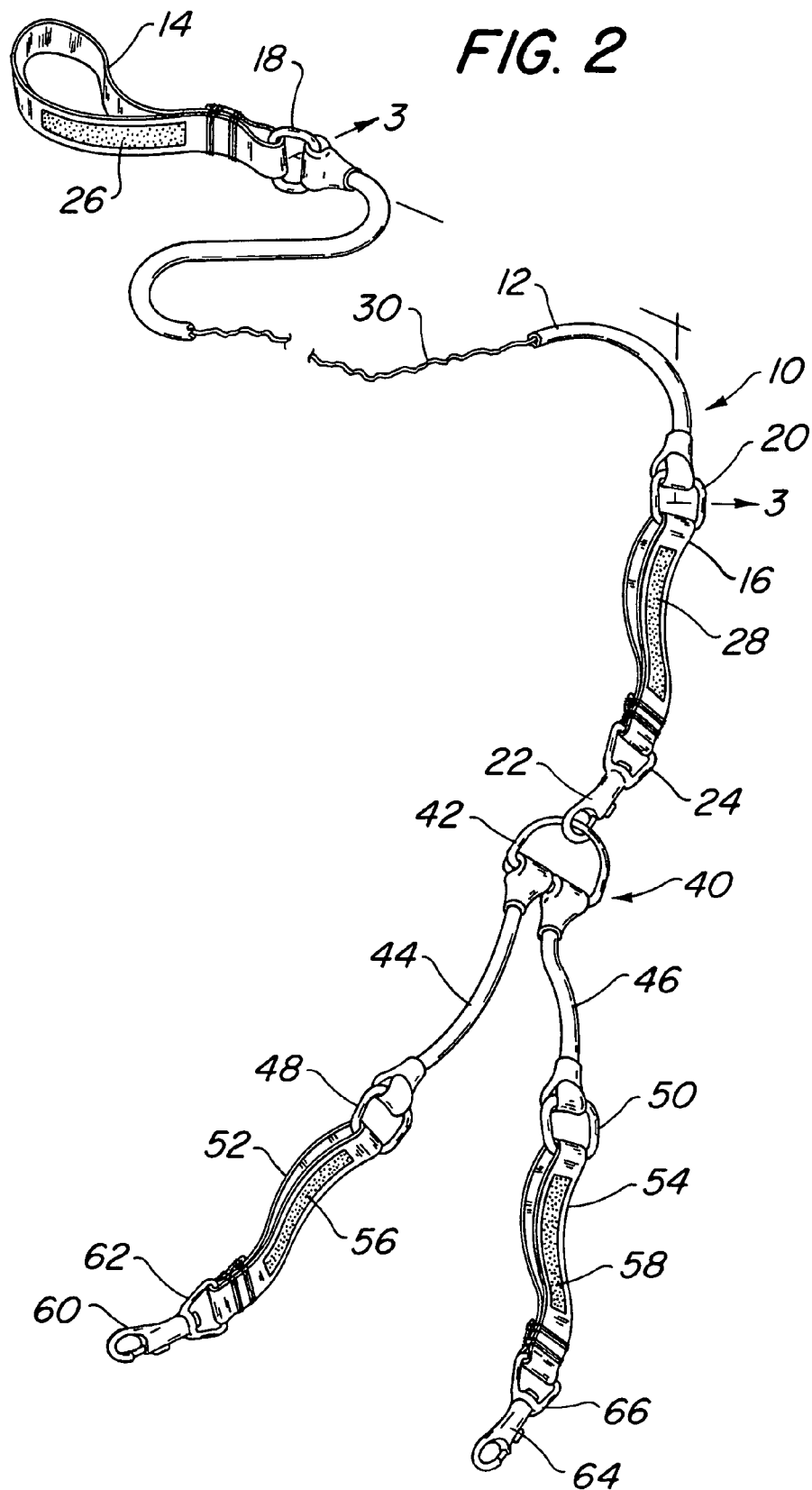
FIG. 2 is a view in perspective of a leash and a coupler wherein the leash is partially broken away to illustrate a line contained within the tubing.

Referring now to FIGS. 1 and 2, there is shown a leash 10 which is comprised of elastic tubing 12 preferably constructed of florescent colored surgical tubing. By surgical tubing, it is meant that the tubing is made of at least 90% rubber made from latex or latex rubber. In a presently preferred embodiment, the tubing is made of approximately 95% rubber made of latex or latex rubber, the remaining 5% may be vulcanizing compound ingredients. Tubing suitable for use in practicing the present invention is commercially available from Primeline Industries, 4083 Embassy Parkway, Akron, Ohio 44333.

The tubing 12 may be of any color, but is preferably a brightly florescent color such as yellow, such as is illustrated in FIGS. 1 and 2, or blue, pink, purple, red, lemon, green, orange or any other bright color which makes the tubing readily visible.

The tubing may be of various diameters, such as from ¼ inch to 1 and ½ inches in diameter. It is presently preferred that there would be multiple diameters utilized for dogs of different sizes. It is presently preferred that there would be four sizes of tubing with corresponding different widths and/or thicknesses of webbing for handles 14 and stop sections 16 to be discussed hereinafter.

Referring to FIGS. 1 and 2, a presently preferred length of tubing for section 12 would be three feet. However, it is understood that various other lengths may be utilized.

As illustrated in FIGS. 1 and 2, there is shown a 7 inch preferred length of double webbing looped material (14 inches when looped) which comprises handle 14. The webbing material of handle 14 is preferably non elastic. A preferred length of the handle section is 7 inches, however, it is understood that various other lengths of handle may be utilized.

Attached to the other end of the tubing 12, there is shown a stop section 16 of the leash 10. Stop section 16 is made of a webbing material which is non elastic. This is a portion of the leash which may be grabbed to hold the dog firmly, particularly when the dog may be around elements of danger, such as traffic or the like. Stop section 16 may preferably be 7 inches in length. However, it is understood that various other lengths of stop section may be utilized in practicing the invention.

The webbing of handle 14 and/or the webbing of stop section 16 may preferably be provided with reflective stripes 26 and 28, respectively, which would reflect light at night providing additional safety for a person walking a dog or other animal at night.

Handle section 14 is connected to surgical tubing 12 by means of a ring 18. Preferably, ring 18 may be chrome plated iron or steel. However, it is understood that various materials may be utilized to construct ring 18 including other suitable materials and various plastics.

Stop section 16 is connected to surgical tubing 12 by means of ring 20 which is illustrated in FIGS. 1 through 4C. Ring 20 may be similar to that of ring 18, and is preferably chrome plated, but may be made of other materials including other suitable metals and various plastics.

Figure 3:
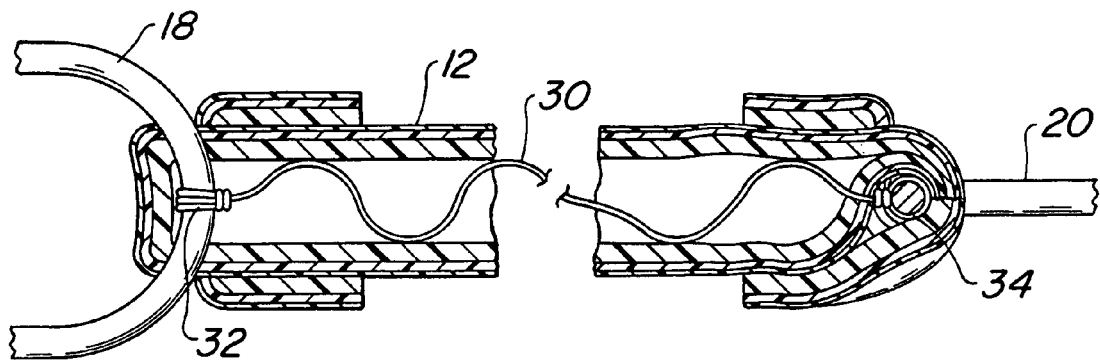
FIG. 3 is a cross sectional view taken along line 3-3 of FIG. 2.

At the dog collar end (or coupler end) of the leash illustrated on the lower left hand side of FIG. 1, there is shown a closeable hook or clasp 22 for securely connecting the leash to a dog collar. This is best illustrated in FIGS. 1, 2 and 3. Hook 22 is provided with its own ring 24 for connecting to stop webbing 16. Closeable hook or clasp 22 may preferably be chrome plated iron or steel. However, it is understood that closeable hook or clasp 22 may be made of any suitable material including other suitable metals and strong plastics.

As discussed above, the thickness of the surgical tubing 12, the handle webbing 14 and the stop webbing 16 may be made in various sizes to accommodate dogs of different sizes. The webbing may be of various widths and it is presently preferred that three widths be provided, namely ⅝ of an inch, ¾ of an inch and 1 inch. However, it is understood that various other widths of webbing may be utilized in practicing the present invention. In other words, it may be desirable to use a larger diameter tubing and larger size webbing material for a large dog and smaller tubing and smaller size webbing material for a small dog.

Some presently preferred sizes or dimensions are given herein for the purposes of illustration, and not for the purposes of limitation. Four presently preferred sizes are contemplated, namely small, medium, large and extra large. In each case the length of tubing 12 in its unstretched condition would be three feet. The width of the rings, which are preferably D-shaped rings, would match the width of the webbing. For example, one inch D-rings would be utilized with one inch webbing.

Small Leash

Tubing—³⁄₁₆ inch I.D. (Inner diameter); ⅛ inch wall thickness
webbing—⅝ inch wide Meduim Leash Tubing—¼ inch I.D.; ⅛ inch wall thickness
webbing—⅝ inch wide Large Leash Tubing—¼ inch I.D.; ³⁄₁₆ inch wall thickness
webbing—¾ inch wide X-Large Leash Tubing—⁵⁄₁₆ inch I.D.; ³⁄₁₆ inch wall thickness
webbing—1 inch wide Referring now more particularly to FIG. 2, there is shown the tubing 12 of leash 10 partially broken away to illustrate line 30 which is contained in tubing 12. Line 30 is secured to first ring 18 and to second ring 20. In this regard, reference should be made to FIGS. 3, 4A, 4B and 4C, as well as FIG. 2. Line 30 may be any strong flexible line, but is preferably monofilament nylon. As illustrated in FIG. 3, line 30 is secured to first ring 18 at 32 and is secured to second ring 20 at 34. Line 30 is preferably significantly longer than the unstretched condition than tubing 12 in its unstretched condition, but shorter than the breaking length of tubing 12. In a presently preferred embodiment, by way of example and not by way of limitation, tubing 12 in it unstretched condition may be three feet long and monofilament nylon line 30 may be six feet long. As illustrated in FIG. 3, monofilament line 30 may be stored in an undulating pattern within the center of tubing 12 when tubing 12 is in its unstretched condition.

Figure 4A:
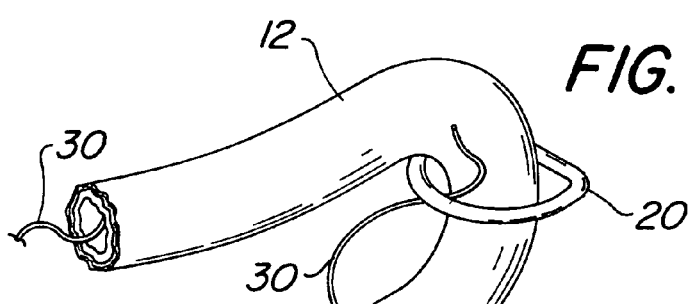
FIGS. 4A, 4B and 4C are views in perspective, partially broken away, illustrating the attachment of the tubing and line to a ring at the end
Figure 4B:
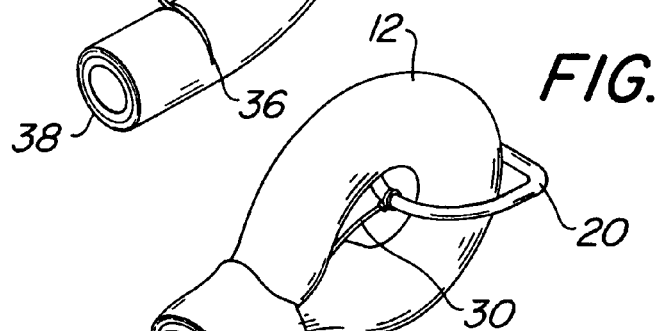
Figure 4C:
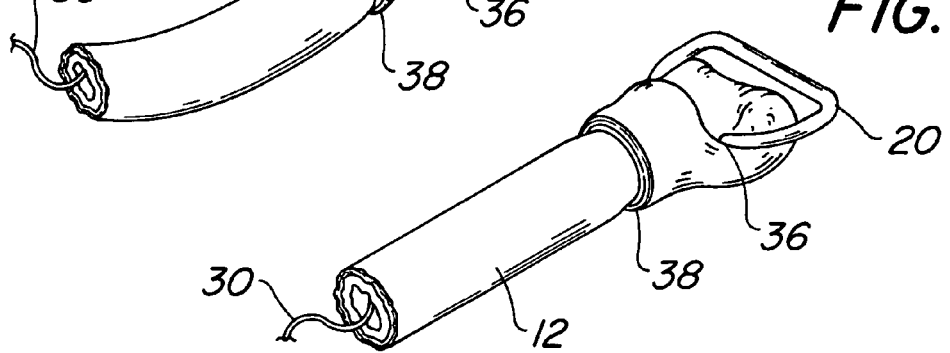

The steps of securing the elastic tubing of both the leash and the coupler to be discussed hereinafter is illustrated in FIGS. 4A, 4B and 4C with respect to an end of tubing 12 being attached to a ring 20. As illustrated in FIG. 4A, a slit 36 is formed a predetermined distance from end 38 of tubing 12. Tubing 12 is first passed through ring 20 and then line 30 is then passed through slit 36 and secured to ring 20 as indicated in FIGS. 4A and 4B. Tubing 12 is then passed through slit 36 and outer end 38 securing tubing 12 to ring 20. When tubing 12 is pulled tight, the end result is as illustrated in FIG. 4C.

Referring now to FIG. 2, there is shown attached to clasp 22 of leash 10 a coupler 40 for coupling multiple animals to the leash, such as multiple dogs. Leash 40 is comprised of a ring 42 for attachment to a leash, such as clasp 22 of leash 10. Ring 42 is preferably a D-shaped ring, but may be of other shapes. As illustrated in FIG. 2, coupler 40 is comprised of two coupler leashes, but other numbers of leashes may be utilized as a part of the coupler. In other words, the coupler illustrated in FIG. 2 is for the coupling of two animals to a leash 10, but the coupler leash may be constructed with three, four or more legs to provide coupling to three, four or more animals.

As illustrated in FIG. 2, there is attached to ring 42 two predetermined lengths of tubing 44 and 46. The attachment of tubing 44 and 46 to ring 42 is as illustrated with respect to FIGS. 3 and 4. Tubing 44 and 46 also contains a monofilament nylon line or other suitable strong line similar to monofilament line 30, which is not shown. Monofilament line 30 within tubing lengths 44 and 46 would be connected to ring 42 at one end and to stop webbing rings 48 and 50, respectively. The monofilament line within tubing 44 and 46 is also of a length which allows substantial stretchability of the tubing, but limits the amount of stretching to less than the breaking point of the tubing. The monofilament line may also be utilized to limit the amount of stretching even though it is below the breaking point of the tubing. In other words, the length of the line does not need to be equated to the breaking point of the tubing, but may be selected to provide a reasonable amount of stretchability of the tubing for the convenience of the user. In a presently preferred embodiment, by way of illustration, and not by way of limitation, the length of the monofilament line may be selected to be twice the length of the unstretched tubing.

At the distal ends of tubing 44 and 46 and connected to stop webbing rings 48 and 50 are nonstretchable webbing material in the form of stop sections 52 and 54, respectively. Stop webbing 52 may be provided with a reflective stripe 56 and stop webbing material 54 may be provided with a reflective stripe 58. A clasp 60 having its own ring 62 is mounted to stop section 52. A clasp or releasable hook 64 having its own pivotable ring 66 it attached to stop section 54. Clasps or closeable hooks 60 and 64 are of structure similar to clasp 22, discussed above.

Some presently preferred sizes or dimensions of coupler 40 are given herein for the purposes of illustration and not for the purpose of limitation. Four presently preferred sizes are contemplated, namely small, medium, large and extra large. As in the case of a leash, the rings 62 and 66 on clasps 60 and 64 would match the width of the nonstretchable webbing.

Small Coupler

Tubing—6 inch length; 3/16 inch I.D.; 1/8 inch wall thickness
Webbing—6 inch length; 5/8 inch width Medium Coupler Tubing—8 inch length; 1/4 inch I.D.; 1/8 inch wall thickness
Webbing—8 inch length; 5/8 inch width Large Coupler Tubing—10 inch length; 1/4 inch I.D.; 3/16 inch wall thickness
Webbing—10 inch length; 3/4 inch width X-Large Coupler Tubing—12 inch length; 5/16 inch I.D.; 3/16 inch wall thickness
Webbing—12 inch length; 1 inch width The present invention may be embodied in other specific forms without departing from the spirit or essential attributes of the invention.

I claim:

1. An apparatus, comprising an animal controller containing an elastic component constructed of tubing comprised of at least 90% latex rubber, wherein said tubing is attached to a first and second ring at its first and second ends by threading the tubing around the ring and back through slits a predetermined distance from the first and second ends of the tubing.

2. An apparatus in accordance with claim 1 wherein said tubing is colored.

3. An apparatus in accordance with claim 2 wherein said colored tubing is comprised of a florescent colored tubing.

4. An apparatus comprising an animal controller containing an elastic component constructed of tubing comprised of at least 95% latex rubber, wherein said tubing is attached to a first and second ring at its first and second ends by threading the tubing around the ring and back through slits a predetermined distance from the first and second ends of the tubing.

5. An apparatus in accordance with claim 4 wherein said tubing is colored.

6. An apparatus in accordance with claim 5 wherein said colored tubing is comprised of a florescent colored tubing.

* * * * *